Figure 1:
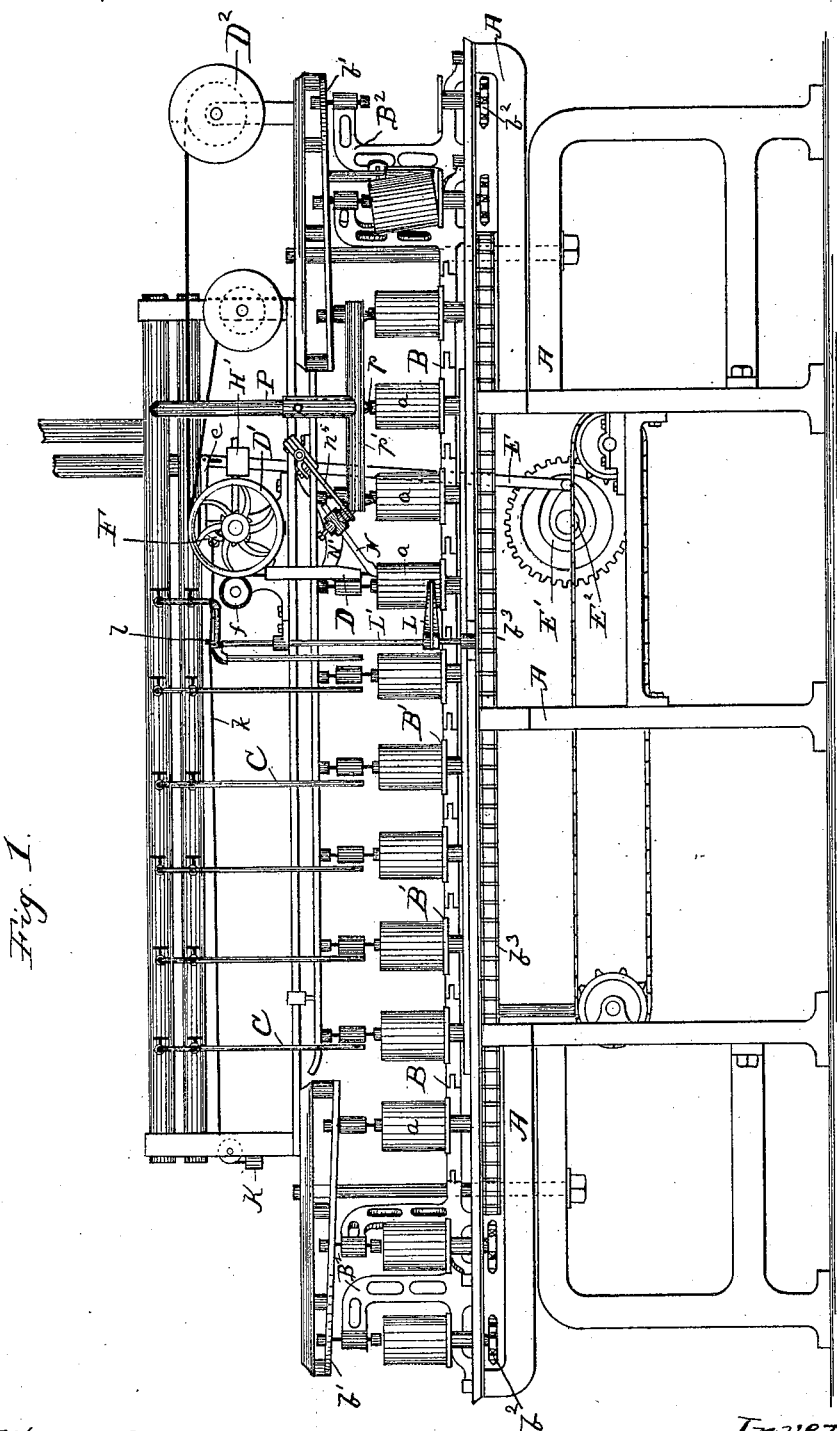

(No Model.)  2 Sheets—Sheet 1.

J. G. HODGSON.
CAN CAP SOLDERING MACHINE.

No. 356,469.  Patented Jan. 25, 1887.

Witnesses:
Lew. E. Curtis
A. M. Munday

Inventor:
John G. Hodgson
By Munday, Evarts and Adcock
his Attorneys

N. PETERS, Photo-Lithographer, Washington, D. C.

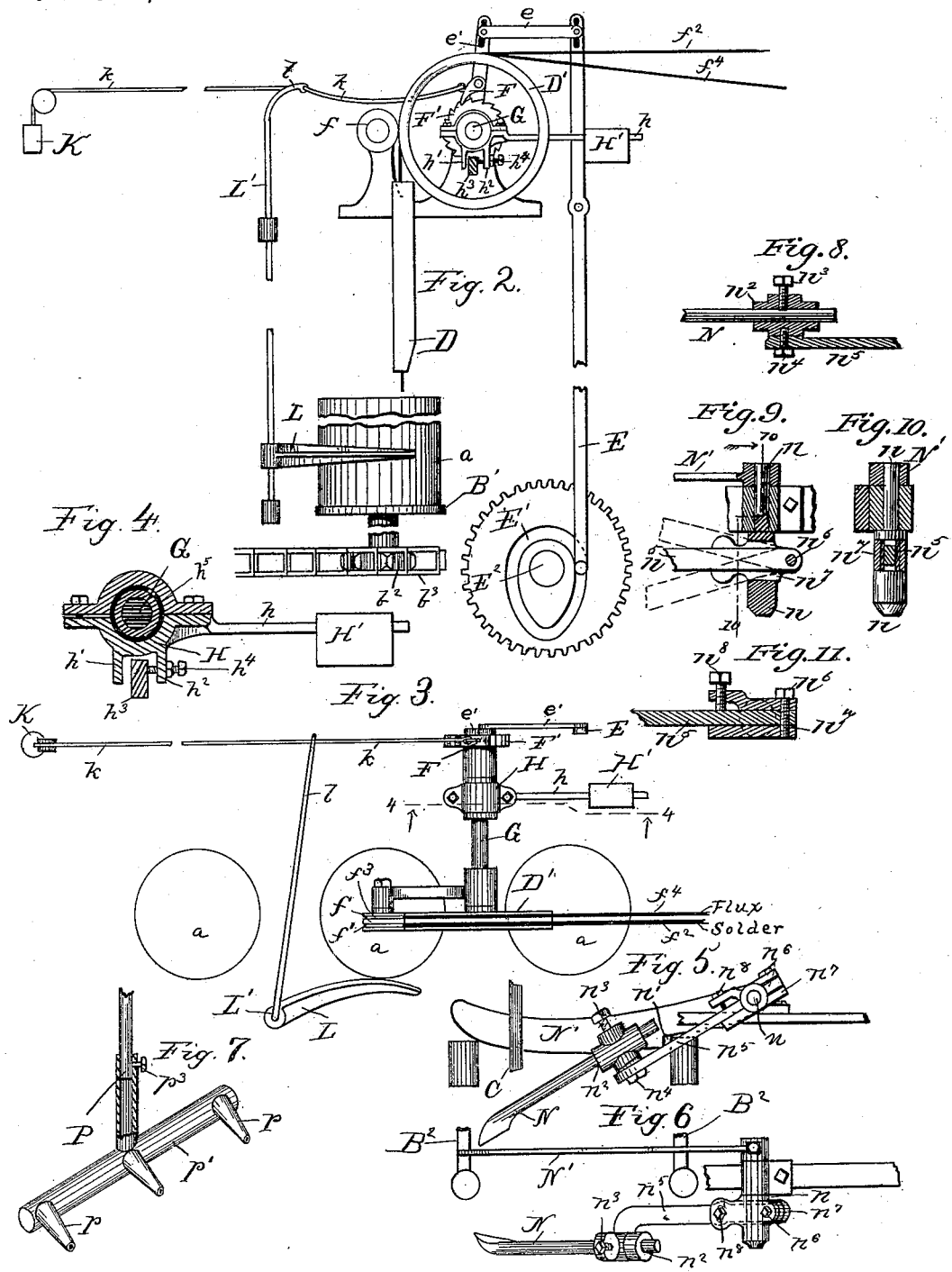

UNITED STATES PATENT OFFICE.

JOHN G. HODGSON, OF CHICAGO, ILLINOIS, ASSIGNOR TO EDWIN NORTON AND OLIVER W. NORTON, BOTH OF SAME PLACE.

CAN-CAP-SOLDERING MACHINE.

SPECIFICATION forming part of Letters Patent No. 356,469, dated January 25, 1887.

Application filed April 17, 1886. Serial No. 199,206. (No model.)

*To all whom it may concern:*

Be it known that I, JOHN G. HODGSON, a citizen of the United States, residing in Chicago, in the county of Cook and State of Illinois, have invented a new and useful Improvement in Can-Cap-Soldering Machines, of which the following is a specification.

My invention relates to improvements in machines for soldering on the caps or final heads of filled cans, and more particularly to improvements upon the can-capping machine shown and described in a previous application, No. 173,212, filed August 1, 1885, by myself and Edwin Norton, and upon which application the patent issued April 20, 1886.

In soldering-machines wherein wire-solder is employed and fed or projected in stated lengths against the heated seam of the can as the cans are successively brought into position by an intermittently-moving carrier it sometimes happens that some of the can-holders on the carrier will advance empty into position under the wire-solder-feed guide and the wire-solder be fed forward, the same as when the can is present to be soldered. This not only occasions a waste of solder, but the length of wire uselessly thus fed forward is likely to be in the way of the succeeding can as it advances into position, and thus necessitate a stoppage of the machine or occasion bad work.

The object of my present invention is to provide a device for arresting the feed of the solder wire when no can is present in any particular can-holder as it advances; or, in other words, to permit the wire-solder only to be fed forward when a can is present in the holder as said holder advances into position. This result I accomplish—and herein my invention consists—by means of a shoe, arm, or lever projecting across the path of the can as it advances on its carrier, which shoe, arm, or lever operates to move the wire-solder-feed mechanism in or out of gear or permit the same to be moved in or out of gear by other force. If a can is in place in its holder, as the carrier advances the can will strike against this shoe or lever, move the same, and thus set the feed mechanism in operation, and the wire-solder will be fed to the joint to be soldered. If, however, no can happens to be in place in the holder, the arm or shoe projecting across the path of the carrier receives no movement, and the wire-solder-feed mechanism remains out of gear and no feed of solder takes place.

Another feature of my invention consists, in connection with an intermittingly-moving carrier and its revolving can-holders and the solder-applying device and heaters, of an automatic stirrer-bar of iron, steel, or other metal, to better distribute the solder over the joint as the can revolves. The point or end of this stirrer-bar rests upon the joint as the can revolves in position under the solder-wire feed-guide. The stirrer-bar may, however, be located farther along in the path of the carrier. It is automatically elevated or moved out of the way of the cans as the same advance from one position to another by means of a cam-arm or curved shoe which strikes against the can-holder frame or other projection on the intermittingly-moving carrier.

Another feature of my invention consists, in connection with other parts of the machine, of a device for slightly withdrawing the solder wire the moment the required length or quantity has been fed to the joint, in order to prevent the extreme end of the wire smearing, streaking, or otherwise injuring the surface of the can-head as the can moves forward on the carrier after being soldered. As a simple and convenient device for this purpose, I provide the shaft of the wire-solder-feed wheel with a friction clamp or clutch having a projecting arm carrying a weight and stops to limit the extent of movement of the arm. When the feed-wheel shaft is revolved forward by the feed mechanism, it turns in the friction-clamp; but the moment the feed-stroke is completed and said wheel ceases to be propelled forward the weighted arm of the friction-clamp turns the shaft and feed-wheel backward slightly, thus withdrawing the end of the solder-wire from contact with the can. Other equivalent or substitute devices may of course be employed for giving this back movement to the solder wire; and if other wire-feed devices should be employed, instead of a feed-wheel, the construction of the withdrawing device will of course be modified to coact with the operation of the particular feed device employed.

Another feature of my invention consists, in connection with other parts of the machine, of a feed device for feeding or applying to the joint-wire a filamentary flux—such, for example, as a mixture of rosin and stearine or paraffine drawn into a wire or filamentary form.

In the accompanying drawings, which form a part of this specification, and in which similar letters of reference indicate like parts, I have shown one, and that which I deem to be the best, form of a machine embodying my invention. In said drawings, Figure 1 is a side elevation of the machine. Fig. 2 is an enlarged detail side view of the solder feed device. Fig. 3 is a plan view of the same. Fig. 4 is a section on line 4 4 of Fig. 3. Fig. 5 is an enlarged detail view of the stirrer or distributer bar. Fig. 6 is a plan of the same, and Fig. 7 is a detail perspective view of the cooling-pipe and nozzles. Figs. 8, 9, 10, and 11 are detail sectional views through the pivots or joints of the stirrer-bar, Fig. 10 being taken on line 10 10 of Fig. 9.

In said drawings, A represents the frame of the machine; B, an intermittently-moving can-carrier, preferably a link-chain, having revolving can-holders $b$ at intervals; B', the track or way upon which said carrier travels; $b'$, a cam or guideway for raising and lowering the upper revolving disk of the can-holder; $b^2$, the sprocket-wheels on the shaft of the lower can-holder disks; and $b^3$, the chain by which the can-holders are revolved.

C C represent heaters, preferably gas jets or burners, at intervals along the path of said carrier. The heater in my machine operates to heat the joint to be soldered. The heated joint is then moved forward by the carrier B to the wire-solder-feed guide or tube, which is located farther along in the path of said carrier, and the wire-solder is then fed or projected against the heated joint and melted by the heat of the joint.

D is the wire solder-feed tube or guide, D' the feed-wheel, and $D^2$ the spool or reel. Motion is communicated to the feed-wheel D' at intervals to feed the solder wire forward the proper length for each can when it is presented in position under the feed-guide by means of a lever, E, operated by a cam, E', on the cross-shaft $E^2$, which lever is connected by a link, $e$, with an arm, $e'$, pivoted on the shaft of the feed-wheel and carrying a pawl, F, that engages a ratchet, F', on the feed-wheel or its shaft G.

The construction and operation of these parts of the machine are the same as shown and described in said previous application, and as the same are not herein a subject of claim it is not thought necessary to a full understanding of my present invention to give a more detailed description of these parts. For a more full description of these parts of the machine I would refer to said previous application and to the patent thereon granted.

My present improvement is equally applicable to other soldering-machines, and I show it in connection with this particular kind of a machine for sake of convenience, and because I believe it constitutes the best way known to me of practicing my present invention.

The feed-wheel shaft G is furnished with a friction-clamp, H, having an arm, $h$, which carries a weight, H', on its outer end. Projections $h'$ $h^2$ on the friction-clamp, striking against a stop, $h^3$, on the frame of the machine, limit the rotary movement of the weighted arm. The friction of the clamp H on the shaft G is sufficient to raise the weighted arm until the projection $h'$ strikes against the stop $h^3$, when the feed-wheel shaft will turn in the clamp H. When, however, the pawl-arm $e'$ completes its forward stroke and the feed of the solder wire and begins to recede, the weighted arm $h$ will drop, and thus turn the feed-wheel shaft backward until the projection $h^2$ strikes against the stop $h^3$, thus drawing back the solder wire from the can. A set-screw, $h^4$, serves to adjust or regulate the extent of backward movement given to the wire. A slight backward movement is all that is required to prevent smearing or discoloring the head of the can with solder.

The mechanism for driving the feed-wheel D' may be most conveniently thrown in and out of gear at the pawl F by simply swinging said pawl into or out of engagement with its ratchet F'. A weight, K, connected by a chain or cord, $k$, with the said pawl, serves to hold the pawl normally out of engagement with its ratchet. A vibrating arm or sleeve, L, secured to the rock bar or shaft L', projects across the path of the carrier B or of the cans $a$ carried thereon. This rock-bar L', near its upper end, has a bent arm, $l$, to which the link $k$ is attached. If a can is in position in the holder $b$ as the carrier B advances, the can striking against the shoe or arm L will turn the rock-shaft L' and cause its bent arm $l$ to pull up the weight K, and thus permit the pawl F to fall into engagement with its ratchet, and therefore turn the feed-wheel when the pawl-arm $e'$ makes its forward vibration. In case, however, no can should be in the holder, the shoe L will receive no movement, and the feed-wheel will consequently not be turned and no feed of the wire will take place.

Any other suitable equivalent or substitute mechanical device may be employed to communicate motion from the shoe L to the pawl F, or to other part of the feed-wheel-driving mechanism to put the same in or out of gear, so that the feeding of the wire will take place according as the cam is pressed in the can-holder or not.

N represents an automatic stirrer-bar or iron, which is depressed against the joint to be soldered to better distribute the solder over the seam and insure uniform and perfect work. This stirrer-bar operates simply to better distribute the solder over the joint, and in no sense as an ordinary soldering-iron to heat the joint and melt the solder. In my machine the joint is heated by the heaters C C before reaching the stirrer-bar. This bar or iron N vibrates or turns on a pivot or rock-shaft, $n$, on the frame of the machine, and is automatically operated by means of a shoe or curved arm, N', which rests and rides on the can-holder frames $B^2$ on the carrier B as they move into and out of position. This shoe N' has a notch or recess, $n'$, on its under face, which permits said shoe, and with it the stirrer-bar N, to drop down the moment the preceding can-holder frame advances to said notch, thus bringing the point of the stirrer-bar in contact with the joint of the revolving can, so that it will thoroughly distribute the solder as the can revolves. When the soldering of the can is completed and the carrier B again advances, the holder-frame $B^2$, impinging against the curved or cam surface of the shoe N', raises the stirrer-bar up out of the way until the next can is brought into position, at which moment the holder-frame $B^2$, upon which the shoe N' is resting, will have advanced to the notch $n'$, and thus permit the iron N to be depressed against the joint of such succeeding can. The shoe or cam N' should be long enough to span the interval between two contiguous can-holders.

For convenience in adjusting the bar N to the seam or joint to be soldered, it is adjustably secured in a socket, $n^2$, by a set-screw, $n^3$, which socket $n^2$ is fixed by a set-screw, $n^4$, on the shank $n^5$, so that said socket and the bar N may be set at different angles to the shank or arm $n^5$, and the arm $n^5$ is pivoted by a pin, $n^6$, to a plate or projection, $n^7$, on the shoe N', or rather its rock-shaft or pivot $n$, so that said arm $n^5$ may be swung laterally in or out, as may be required, to bring the point of the iron N in proper adjustment. A set-screw, $n^8$, serves to fix the arm $n^5$ in any desired position. The shoe N' and arm $n^5$ are both secured to the rock-shaft or pivot $n$, which unites them, and said pivot or rock-shaft is journaled on the frame of the machine. The bar N may be adjusted longitudinally in the socket $n^2$, and said socket may be adjusted radially on the arm $n^5$. By this way of mounting the movable iron N it may have about the same movements or adjustments as if held in the hand of an attendant, and may be brought into any desired position to accommodate cans or caps of different sizes or diameters. My invention, however, is not confined to this or any other particular way of mounting the stirrer-bar N. For example, it may, if desired, be connected directly and rigidly to its pivot or rock-shaft $n$ or to the vibrating shoe N'.

A burner, C, is located near the bar N, to heat and keep the same properly heated.

Any suitable device may be employed for applying flux to the joint—as, for example, that shown and described in said previous application, No. 173,212, or that shown and described in a previous application, No. 197,780, filed April 5, 1886, by myself and Edwin Norton, and wherein a combined solder wire and flux is employed. The fluxing device herein shown and described, however, is specially adapted to apply a solid flux in the form of a wire or filament—such, for example, as rosin and paraffine, stearine, beeswax, or other suitable materials drawn out into wires or filaments.

The wire-solder-feed wheel D' and its roller $f$ are furnished with two grooves—one, $f'$, for the wire-solder $f^2$, and one, $f^3$, for the filamentary flux $f^4$—and the wire solder guide D is likewise furnished with double channels—one for the solder and the other for the flux. O represents the spool or reel for the flux wire or thread. By this means the flux and solder are simultaneously fed to the joint by the same feed-actuating mechanism. The feed-wheel for the flux is shown, for convenience, integral with and of the same diameter as the feed-wheel for the solder; but it will of course be understood that separate wheels may be employed, or wheels of different diameters, according as may be required by the relative sizes of the flux and solder filaments employed and the relative quantities of each necessary to be supplied to each joint.

The cooling device P consists of an air or steam blowing pipe provided with nozzles $p$, secured to the head or cross pipe $p'$, which is adjustable up and down on the pipe P to accommodate cans of different sizes. A set-screw, $p^3$, serves to fix the adjustable head in position.

My present invention is not limited to any particular kind of intermittently-moving carrier, can-holders, heaters, or wire-solder-feed device, or mechanism for actuating the same.

It will of course be understood that in place of the weighted arm a spring may be employed to give the back movement to the feed-wheel, or such movement may be imparted to it by still other means; and instead of the weight K a spring may be substituted, or the movement of the curved arm or lever L may be communicated directly or indirectly to the pawl or other clutch mechanism for throwing the feed-wheel or feed device in or out of operation without the intervention of any spring or weight of any kind; and the arm or shoe L, instead of being positively actuated by contact with the can in the can-holder, may, if preferred, be actuated by a spring or weight and held from operation by the can in the holder, so that the arm can only move when no can is present in the holder. In this equivalent arrangement the feed device remains normally in gear or operation, and is moved out of gear by the spring throwing the arm L in across the path of the cans whenever there is no can in the holder to hold the arm L in its normal position.

The clamp H is furnished with a leather or other yielding packing, $h^5$.

I claim—

1. In a soldering-machine, the combination, with an intermittingly-moving can-carrier having revolving can-holders at intervals, of a heater, a wire-solder-feed device, and a device for slightly withdrawing the wire from the can or seam after each forward feed of the same, substantially as specified.

2. In a soldering-machine, the combination, with an intermittingly-moving can-carrier having revolving can-holders at intervals, of a heater, a wire-solder-feed device, and a device for putting said feed in or out of operation by the can in said holder, so that the wire will only be fed when a can is present in the holder, substantially as specified.

3. In a soldering-machine, the combination, with an intermittingly-moving can-carrier having revolving can-holders at intervals, of a heater, a wire-solder-feed device, and an automatic stirrer-bar located in the path of said carrier, said heater operating directly to heat the joint of the can, and located in the path of said intermittingly-moving carrier at a point or stop in said path preceding said stirrer, so that the joint is heated before being presented to the stirrer, substantially as specified.

4. In a soldering-machine, the combination, with an intermittingly-moving can-carrier having revolving can-holders at intervals, of a heater, a wire-solder-feed device, and a device for slightly withdrawing the wire from the can or seam after each forward feed of the same, and a device for putting said feed in or out of operation by the can in said holder, so that the wire will only be fed when a can is present in the holder, substantially as specified.

5. In a soldering-machine, the combination, with an intermittingly-moving can-carrier having revolving can-holders at intervals, of a heater, a wire-solder-feed device, a device for slightly drawing the wire from the can or seam after each forward feed of the same, and an automatic stirrer-bar located in the path of said carrier, substantially as specified.

6. In a soldering-machine, the combination, with an intermittingly-moving can-carrier having revolving can-holders at intervals, of a heater, a wire-solder-feed device, a device for slightly withdrawing the wire from the can or seam after each forward feed of the same, an automatic stirrer-bar located in the path of said carrier, and a device for putting said feed in or out of operation by the can in said holder, so that the wire will only be fed when a can is present in the holder, substantially as specified.

7. The combination, with an intermittingly-moving carrier having revolving can-holders, of a wire-solder-feed wheel, a friction-clamp, and weighted arm and stops for giving said feed-wheel a slight backward movement, substantially as specified.

8. The combination, with a wire solder-feed wheel, $D'$, of a clamp, H, arm $h$, weight $H'$, stop $h^3$, and projections $h'$ $h^2$, substantially as specified.

9. The combination, with an intermittingly-moving can-carrier, of a wire-solder-feed wheel or device, a movable arm or shoe adapted to project across the path of the cans on said carrier, and mechanism, substantially as described, connecting said arm and wheel or shoe, serving to put said feed-wheel in or out of operation, substantially as specified.

10. The combination, with a moving can-carrier, of a wire-solder-feed wheel, ratchet $F'$, pawl F, arm L, and mechanism, substantially as described, connecting said arm L with said pawl F, substantially as specified.

11. The combination, with a can-carrier, of wire-solder-feed wheel $D'$, ratchet $F'$, pawl F, shoe L, rock-shaft $L'$, having bent arm $l'$, weight K, and cord $k$, substantially as specified.

12. The combination, with a can-carrier, of a wire-solder-feed wheel, an arm projecting across the path of said carrier, and clutch mechanism operated by said arm to set said feed-wheel in operation, substantially as specified.

13. The combination, with a can-carrier, of a solder-applying device, a stirrer-bar, N, and a vibrating arm, $N'$, actuated by projections on said carrier to automatically operate said stirrer-bar, said stirrer-bar being connected with said vibrating arm, substantially as specified.

14. The combination, with a can-carrier, of a solder-applying device, a stirrer-bar, N, and a vibrating arm, $N'$, actuated by projections on said carrier to automatically operate said stirrer-bar, and a heater or burner arranged in proximity to said stirrer-bar, said stirrer-bar being connected with said vibrating arm, substantially as specified.

15. The combination, with a can-carrier having can-holder frames $B^2$, of a solder-applying device, a stirrer-bar, N, and a vibrating arm or shoe, $N'$, having a notch or recess, $n'$, on its under face, and adapted to ride on said can-holder frames, said stirrer-bar being connected with said vibrating arm, substantially as specified.

16. The combination, with a can-carrier having can-holder frames $B^2$, of a solder-applying device, a stirrer-bar, N, and a vibrating arm or shoe, $N'$, having a notch or recess, $n'$, on its under face, and adapted to ride on said can-holder frames, and adjustable socket $n^2$, and arm $n^5$, adjustably connecting said stirrer-bar with said vibrating arm, substantially as specified.

17. The combination, with a can-carrier having can-holder frames $B^2$, of a solder-applying device, a stirrer-bar, N, and a vibrating arm or shoe, $N'$, having a notch or recess, $n'$, on its under face, and adapted to ride on said can-holder frames, and adjustable socket $n^2$, having set-screw $n^3$, arm $n^5$, pivot $n^6$, and set-screw $n^8$, substantially as specified.

18. In a soldering-machine, the combination, with an intermittingly-moving can-carrier having revolving can-holders at intervals, of a feed-wheel provided with two grooves or channels, one for feeding solder and the other for feeding flux in a wire or filamentary form, substantially as specified.

19. The combination, with a can-carrier having revolving can-holders, of a wire-solder-feed device and a wire-flux-feed device, substantially as specified.

JOHN G. HODGSON.

Witnesses:
ARTHUR L. FANNING,
EDWIN L. HORTON.